United States Patent [19]

Limpert

[11] 3,766,773

[45] Oct. 23, 1973

[54] PORTABLE TURBULENT FLOW COMPARISON RHEOMETER

[75] Inventor: John C. Limpert, Baltimore, Md.

[73] Assignee: The United States of America as represented by the Secretary of the Navy

[22] Filed: Nov. 24, 1971

[21] Appl. No.: 201,648

[52] U.S. Cl. .................................................. 73/56
[51] Int. Cl. .......................................... G01n 11/04
[58] Field of Search ............................ 73/56, 55, 57

[56] References Cited
UNITED STATES PATENTS 1,529,811   3/1925   Priest ..................................... 73/56
3,327,522   6/1967   Hoyt ....................................... 73/55

Primary Examiner—Richard C. Queisser
Assistant Examiner—Joseph W. Roskos
Attorney—R. S. Sciascia et al.

[57] ABSTRACT

The invention is a portable turbulent flow comparison rheometer for evaluation of fluids exhibiting drag-reducing properties. The device is capable of directly measuring and recording differences in flow rates produced by identical pressures between two fluids.

9 Claims, 2 Drawing Figures

PORTABLE TURBULENT FLOW COMPARISON RHEOMETER

The invention described herein may be manufactured and used by or for the Government of the United States of America for Governmental purposes without the payment of any royalties thereon or therefor.

BACKGROUND OF THE INVENTION

Reduction of drag in turbulent fluid flow by the addition of minute amounts of certain high molecular weight organic polymers has received growing interest in recent years. Concurrently, there existed a need for a simple, rapid, and accurate means to measure drag-reduction. The U.S. Pat. No. to Hoyt, 3,327,522, shows a recent attempt to produce such an instrument. The Hoyt instrument utilizes constant velocity while measuring changes in pressure. The instant invention, however, utilizes constant pressure while measuring changes in velocity. The instant invention has the further advantages that it is portable, and gives a direct comparison between a standard and a test liquid, whereas the Hoyt device is not portable and requires two separate measurements. It must be noted that the U.S. Pat. No. to Priest, 1,529,811, at first glance, appears structurally similar to the instant invention. The instant invention is a turbulent flow rheometer, whereas Priest discloses a laminer flow instrument. Laminer flow instruments deal only with functions and used only to measure Newtonian fluids. Specifically, the Priest instrument is a viscosity measuring device. Structurally, the pistons of Priest are not in fluid tight contact with the cylinder walls, as in the instant invention, and, in fact, the Priest invention, depends on such clearance to be operative. Viscosity measuring devices requiring laminer flow have been in existence for more than 400 years. Only recently have attempts been made to produce a turbulent flow rheometer to evaluate drag-reduction.

SUMMARY OF THE INVENTION

The general purpose of the portable turbulent flow comparison rheometer is to provide a device to correctly measure and record differences in flow rate, produced by identical pressures between two fluids; said device being portable and requiring no external power.

OBJECTS OF THE INVENTION

It is a primary object of the instant invention to produce an accurate means to measure drag-reduction.

It is a further object of the instant invention to provide an inexpensive, essentially maintenance-free rheometer.

It is still another object of the instant invention to provide a portable, simple to operate rheometer which requires no external power source.

Still another object of the instant invention is to produce an apparatus with good precision that is sensitive to low concentrations of high molecular weight organic polymers.

DESCRIPTION OF THE PREFERRED EMBODIMENT

Considerable interest exists in understanding the mechanism by which long chain polymers in dilute solution reduce frictional drag. This involves determining the percent drag-reduction. The current approach is to compare the flow rate of the service fluid with that of the service fluid containing the drag-reduction polymer leading to the formula Percent Drag-Reduction = $t_s - t_p/t_s \times 100$ .... (1)

where $t_s$ = wall shear stress of the service fluid;

$t_p$ = wall shear stress of the service fluid plus polymer.

Since the wall shear stress is directly proportional to the pressure drop, $\Delta P$, equation (1) can also be written as Percent Drag-Reduction = $\Delta P_s - \Delta P_p/\Delta P_s \times 100$ .... (2)

Equations (1) and (2) represent the concept of comparing two fluids having different rheological properties. This is done by making successive measurements of the pressure drop between two points along a capillary tube under turbulent flow conditions. This requires drilling two holes into the capillary tube and attaching a differential pressure transducer. Signals from the transducer are amplified for recording purposes. This is a method disclosed in the U.S. Pat. No. to Hoyt, 3,327,522.

The concept of the comparison rheometer involves making simultaneous measurements of the fluids with and without the polymer additive, recording the difference, and relating this difference directly to the amount of drag-reduction.

Figure 1:
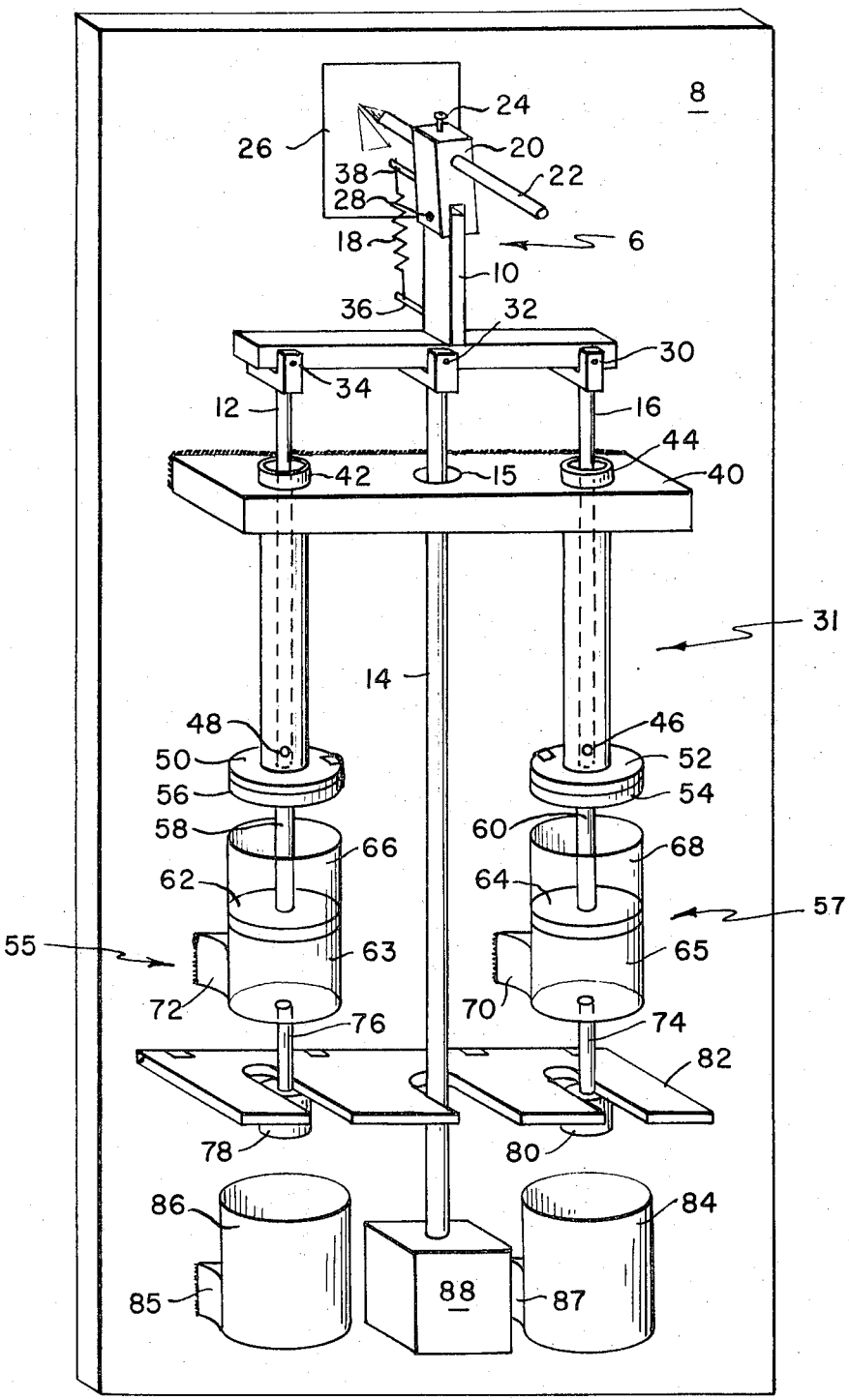
FIG. 1 shows the portable turbulent flow comparison rheometer in operation.

With continued reference to the drawing, FIG. 1 shows a pair of commercially available glass syringes 55 and 57. The syringes comprise plungers 56 and 54, shafts 58 and 60, cylinders 66 and 68, and syringe needles 76 and 74, respectively. One syringe for example, 55, is filled with a control fluid 63, usually water, the other syringe is filled with a test fluid 65, usually water plus a drag-reducing agent. After the air is expelled, each needle 76 and 74, is capped with a stopper 78 and 80, respectively. The syringes 55 and 57 are then inserted into their respective holders 72 and 70. The load unit 31 is then connected with the plungers 56 and 54. The load unit 31 comprises weight rod 14 connected to weight container 88, the weight rod being connected by pin 32 to the T-head 10, which connects through pins 34 and 30 to load rods 12 and 16, respectively. load rods 12 and 16 are connected by pins 48 and 46 at their lower ends to sleeve members 42 and 44, respectively. Sleeve members 42 and 44 slide vertical direction freely with respect to support bar 40. Support bar 40 and holders 70 and 72 are all rigidly attached to back plate 8. It is noted that weight container 88 may contain various desired loads corresponding to desired pressures that the fluids may be subjected to. Push plates 50 and 52, connected to the lower ends of sleeve members 42 and 44, rest upon plungers 56 and 54, respectively. Weight rod 14 is free to slide in the vertical direction through support bar 40 via guide 15. Push plates 50 and 52 are placed in contact with plungers 56 and 54, respectively.

The recording device 6 also includes the T-head 10 of the load unit 31, and holder 20 connected by pin 28 to T-head 10. The holder 20 holds a writing instrument 22 via thumbscrew 24. The holder 20 is biased toward recording paper 26 by biasing means 18. Biasing means 18 may be any resilient means and is connected to holder 20 and T-head 10 by projections 38 and 36. The writing instrument 22 is placed in contact with the recording paper 26. The hinged trigger 82 is then depressed which simultaneously pushes both stoppers 78 and 80 from the end of each needle 76 and 74 into the cups 86 and 84. Cups 86 and 84 are attached to back plate 8 by supports 85 and 87, respectively. The load of load unit 31 is now equally divided by the T-head 10 and applied to both syringe plungers 56 and 54 by the load rods 12 and 16 inside the sleeve members 42 and 44. The entire load unit 31 descends as each syringe 55 and 57 exhausts to its cup, 86 and 84, respectively. If the flow properties of the fluids differ, one syringe will empty more rapidly than the other causing the T-head 10 to tilt as it descends thus causing the writing instrument 22 to trace a diagonal line upon the recording paper 26. The diagonal line will continue until the piston 62 or 64 of the faster running syringe bottoms out. The control syringe will now continue until its piston bottoms out while the writing instrument traces an arc back to the neutral position. The weight container 88 is then removed with the writing instrument 22 still in contact with the recording paper 26. The mechanism is gently raised and lowered by hand, touching only the weight rod 14. A straight vertical stroke line should be traced, indicating no stray friction in the mechanical components. The writing instrument 22 is now lifted and the mechanism raised and held in its highest position again. The cups are emptied and the stoppers 78 and 80 retrieved. This completes one-half of the test. The syringes are now extracted from their respective holders and filled for the second half of the test, this time with the control fluid in the syringe that previously contained the test fluid. Repeat the same procedure. This time, the diagonal trace will fall on the opposite side of the vertical stroke line.

Figure 2:
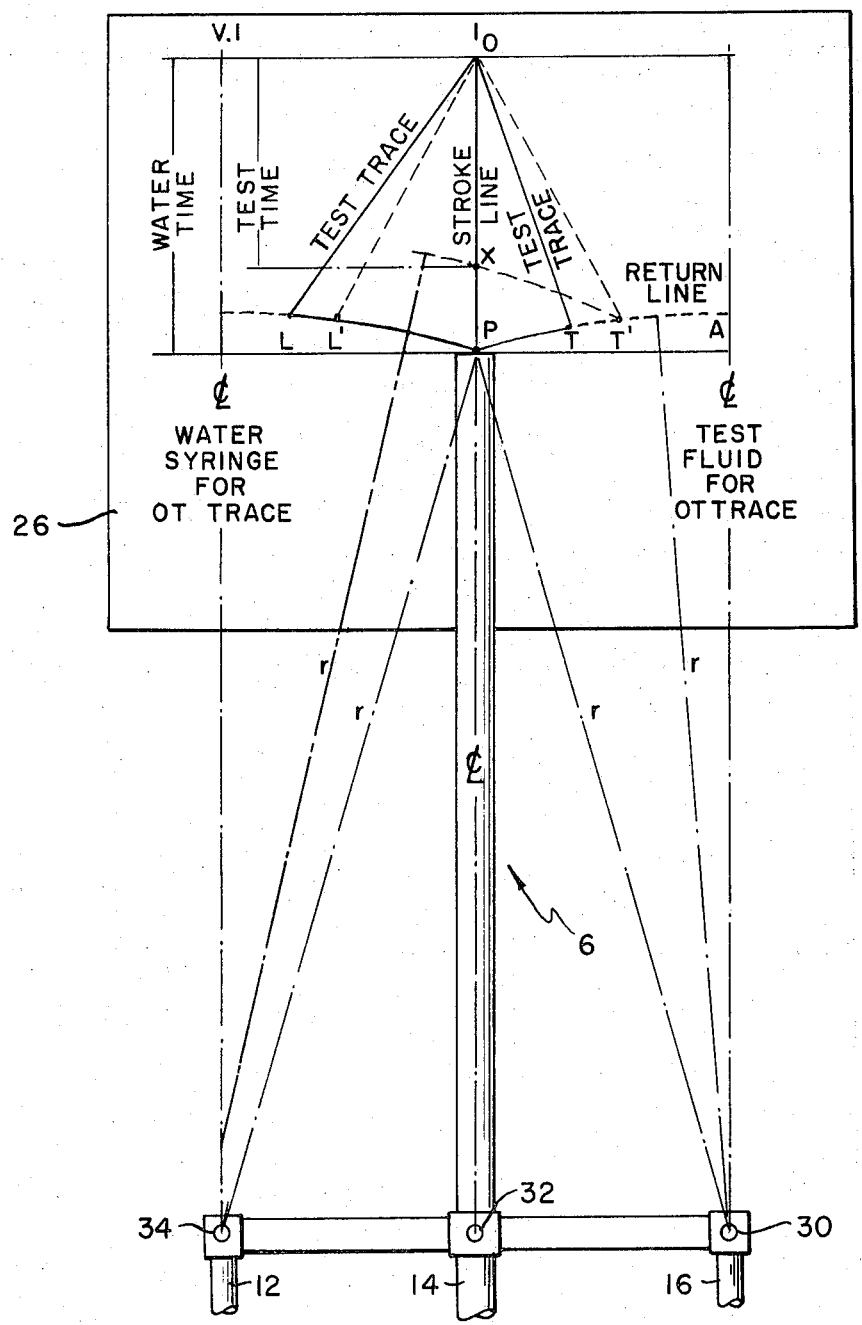
FIG. 2 shows the specific recording device and typical data obtained in FIG. 1.

With reference to FIG. 2, while there is no significant friction in the mechanical components, there are slight differences in the sliding characteristics between the syringes. This effect is manifested in this device by what might be termed a machine constant which in FIG. 2 are angles LOL' positive and the angle TOT' negative. The error due to non-identical friction in the mechanical components is overcome by making two runs and switching the control fluid to alternative syringes for each of the two test runs, the machine constant is made to cancel and the actual trace angle LOT equals the theoretical angle L'OT'. The magnitude of angle LOT is directly proportional to the amount of drag-reduction.

In the following explanation only one side of the diagram need be considered. Line OP defines the stroke direction. Its length is proportional to the time required for the control syringe to empty. This time may be used as a reference and will be constant unless there are alterations in applied weight, temperature, or needle dimensions. Line OP would be the trace if both syringes contained the same fluid. When a test fluid is compared with water, the test trace proceeds from O to T. Point T occurs when the test fluid syringe is emptied and its piston has bottomed out. The writing instrument now goes along the return line ATP to point P where the water syringe is now empty. The return line ATP is a circumference whose radius is the hypotenuse of the T-head and is centered on the test fluid syringe center line. The time taken for the test fluid to discharge from its syringe may be determined as follows: the theoretical angle L'OT' is constructed by measuring the actual angle LOT and placing it so that its bisector is line OP. The radius $r$ is centered on the water syringe center line so that its circumference intersects ATP at T', which is the end point of the corrected test trace, and OP at X. The test fluid discharge time equals the linear ratio OX/OP times the constant discharge time when both syringes are filled with water. The flow rate then may be determined from this test time and volume discharged. Geometry of the rheometer components, weight, and reference time are known. If densities, viscosities, and syringe needle cross-section areas are also known, the Reynolds number can also be calcualted. Angle TOP is a function of fluid drag-reduction since identical conditions have produced different flow rates. Other flow rates may be obtained by varying weight and/or needle dimensions.

It is understood that the invention is not limited to the exact details of construction shown and described for obvious modifications will occur to persons skilled in the art. It is therefore to be understood that within the scope of the appended claims, the invention may be practiced otherwise than as specifically described.

What is claimed is:

1. A portable turbulent flow comparison rheometer for drag-reduction comparison of two fluids, which comprises:

first and second fluid containing means for holding said fluids to be compared, said containing means having an orificial passage to allow the fluid to escape when pressure is exerted on said fluids;

pressure exerting means connected to said first and second fluid containing means to simultaneously apply equal and constant pressure to each fluid to cause turbulent flow through the orificial passage and recording means integral with said pressure exerting means to record the emptying of the first and second fluid containing means with respect to each other and thereby compare the two fluids' drag-reduction characteristics.

2. A device as in claim 1 wherein said pressure exerting means is in fluid tight relationship to said first and second fluid containing means.

3. A device as in claim 2 wherein said pressure exerting means includes a T-bar operatively connected at the symmetrical ends of the cross bar thereof to said first and second pressure exerting means, said recording means being integral with the end of the stem of said T-bar.

4. A device as in claim 3 wherein said pressure exerting means further includes load means pivotly connected to said T-bar to rotate about the connection of said load means to said T-bar if one fluid is expelled from either of the containing means faster than the other.

5. A device as in claim 4 wherein said first and second fluid containing means are syringes.

6. A device as in claim 3, wherein said recording means includes a pen attached to said T-bar so as to scribe an angle with the vertical which is a measure of the tilt of the T-bar, comprising:

a vertical surface; and a means to bias said pen against said vertical surface to record the differential motion between said first and second pressure exerting means during the descent of the T-bar.

7. A portable turbulent flow comparison rheometer as in claim 1, wherein;
said pressure exerting means includes a weight which causes the pressure exerting means to apply equal and constant pressure to each fluid to force the fluids out of their respective fluid containing means.

8. A device suspended by a support bar as in claim 1, wherein;
said pressure exerting means comprises;
a first and second piston;
a first and second push plate engaging said first and second piston respectively;
a first and second sleeve member slidingly engaged with said support bar and rigidly attached and extending vertically from said respective first and second push plates;
a first and second load rod substantially within said respective first and second sleeve members and connected to a T-bar on their upper ends and attached to said respective first and second push plates below the point of sliding engagement between said first and second sleeve members and said support bar.

9. A method of comparing the turbulent, non-viscous flow characteristics of two liquids comprising:
placing a first liquid in a first fluid containing means;
placing a second liquid in a second fluid containing means;
placing a first and second pressure exerting means in fluid tight relationship with said first and second fluid containing means respectively;
releasing a weight to apply a constant and equal force through a linkage to the pressure exerting means;
allowing the pressure exerting means to move with respect to said fluid containing means and exert a constant pressure on said fluid;
allowing the first and second liquids to pass by turbulent flow through an orifice leading to a tube from each of the first and second fluid containing means;
producing a line on a vertical surface which is at an angle with the vertical wherein said angle is a measure of the relative speed of turbulent flow through the orifice of said first and second fluid containing means respectively;
raising the weight to its initial position;
completely exchanging the fluids by placing said first liquid in said second fluid containing means and placing said second liquid in said first liquid containing means;
repeating the above steps to produce a line opposite the vertical from the previously recorded line so that the angle between the two lines is an indicia of the relative turbulent flow characteristics of the compared liquids without error due to lack of precise identity of the first and second mechanisms.

* * * * *